Figure 1:
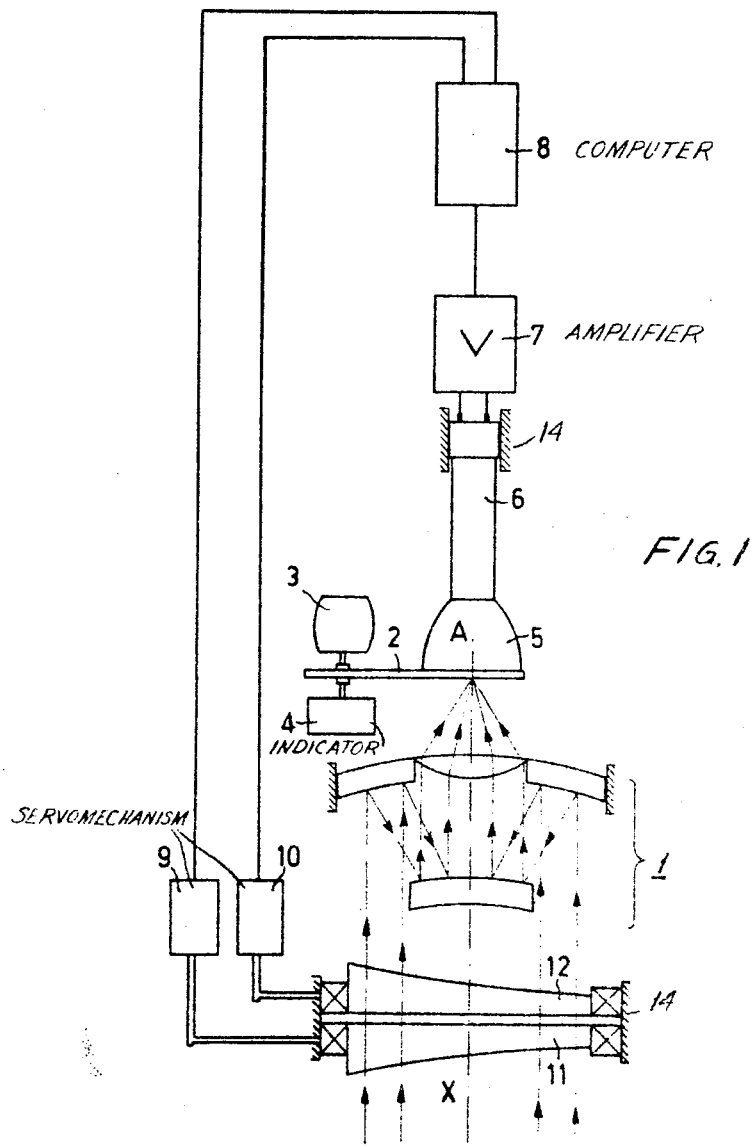

Feb. 15, 1966  A. DAUGUET  3,235,733

PHOTOSENSITIVE RADIATION TRACKER USING PLURAL PRISMS

Filed July 10, 1961

INVENTOR
ALEXANDRE DAUGUET

United States Patent Office 3,235,733
Patented Feb. 15, 1966

3,235,733
PHOTOSENSITIVE RADIATION TRACKER USING PLURAL PRISMS
Alexandre Dauguet, Paris, France, assignor to North American Philips Company, Inc., New York, N.Y., a corporation of Delaware
Filed July 10, 1961, Ser. No. 122,741
Claims priority, application France, July 20, 1960, 833,439
8 Claims. (Cl. 250—203)

The invention relates to a device for space-scanning with radiation detectors.

Such devices have already been described in Belgian patent specification 546,732.

In said patent specification, the optical system for the exploration of space comprises an automatic pursuit apparatus which is suspended on a slide which enables it to move in two directions which are at right angles to each other, the movements being determined by control apparatus which receive their control voltage from an electronic computer which, starting from the signals received by the radiation detector, constantly calculates the co-ordinates of a centre of gravity of the radiation sources, in which a weight is given to these sources which is proportional to their brightness, in a manner such that the apparatus which has become self-directing, directs itself to certain sources while leaving the other out of consideration. The invention relates in particular to a self-directing apparatus.

Such a device according to the above patent specification is complicated and heavy because the assembly, formed by the optical concentration and analysis system, the substantially "accurate" receiver with a cooling system and the amplifier preceding the computer, has to be suspended in a kind of boat between slides.

The object of the invention is to simplify the apparatus and to make it lighter by a different construction in which the apparatus fulfills the same function, namely by constructing it so that it may be operative in an automatic pursuit apparatus.

The invention is characterized in that, whereas the optical concentration and modulation system, as well as the receiver tube and the amplifier are rigidly fastened to the frame of the apparatus, a diasporameter having two rotating prisms is provided before the optical concentration system and that the various motions of rotation of the two prisms of the diasporameter are caused by servo-mechanisms which receive their control voltages from a computer which is connected to the said amplifier.

It is noted that the diasporameter, constituted by two prisms rotating about the same shaft, serves for measuring the curvature which is to be given to a lens destined to form an achromatic assembly with another lens, and has already found ready application in which, to analyse a picture optically, for example according to diameter or helical line, the motions of rotation of the prisms are regular and continuous but that it was not known to control in itself the motions of rotation of the component prisms according to a law which is dependent on the motion of pursuit.

Figure 2:
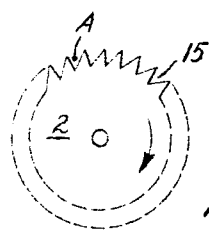

In order that the invention may readily be carried into effect, one embodiment thereof will now be described, by way of example, with reference to the accompanying drawing, wherein:

FIG. 1 illustrates one embodiment of the invention in schematic block diagram form; and FIG. 2 illustrates a preferred form of modulating disc suitable for use with the invention.

Referring to FIG. 1 of the drawing, there is shown an apparatus embodying the invention which can be used in a missile or other movable device, not shown. The frame of the movable device which houses the invention is indicated generally by reference numeral 14. As will become apparent from the discussion to follow, the apparatus of the invention receives radiant energy emanating from a source or sources of radiation, not shown, and automatically directs the apparatus towards the energy soure. The radiant energy is indicated in the drawing by a plurality of arrows.

The radiant energy from the target source passes through a pair of individually rotatable prisms 11, 12, which will be described in greater detail below. The energy is then received by a catadioptric objective 1 comprising a suitable optical system which is arranged to focus the radiant energy onto a focal point A in the plane of a rotating modulator 2. The particular form of the optical system 1 is not a part of the invention and will not be described in detail since many forms thereof will readily suggest themselves to one skilled in the art.

A motor 3 is arranged to rotate a disc 2. The disc has a plurality of sawtooth apertures 15 about its periphery, as shown in FIG. 2. The radiant energy is focused at the point A which falls within the apertures 15. The energy focused at point A is chopped by the rotating disc 2 so as to modulate the radiation received between a maximum value and zero. The position of the point A within the sawtooth aperture is a function of the angle between the axis of the bundle of radiant energy received by the system and the axis of the system. The disc 2 modulates the focused energy to produce a sequence of energy pulses wherein the ratio between the width of a pulse and the time interval between two successive pulses is a function of the position of the focal point A. A deviation of the focal point A from a predetermined position within the sawtooth apertures produces control voltages derived from the above two parameters of the pulses whereby the system realigns itself to return the focal point to said predetermined position. In this manner the system automatically tracks a source of radiant energy. An indicator 4 is coupled to the modulator 2 to provide an indication of the position thereof.

An optical system 5 which may comprise a disc-shaped mirror or other suitable means, is arranged on the far side of the modulator disc 2 so as to collect the modulated energy rays passing through the disc. Optical system 5 focuses substantially all of the received modulated energy onto the sensitive surface of a radiation detector element 6. In the case where the radiant energy is in the visible portion of the radiant energy spectrum, detector element 6 may be a photo resistance cell or a photo diode. If necessary, a liquid nitro cooling system, not shown, may be provided for the detector element in a manner well known in the art.

The detector element converts the received radiant energy into a proportional electric signal output. The output of detector element 6 is connected to the input of an amplifier 7. The amplified electric signal is coupled from the output of amplifier 7 to the input of a computer 8 which automatically calculates the co-ordinate errors to produce so-called "error voltages." The error voltages are constantly applied to servomechanism devices 9 and 10. The servomechanism devices 9 and 10 individually rotate the prisms 11 and 12, respectively, in response to the error voltages received from computer 8. Computer 8 is preferably of the electrical or electromechanical type well known in the art. Computer 8 may be of the general type discolsed in U.S. Patent 2,929,061, which issued March 15, 1960, by Alexandre Dauguet.

Prisms 11 and 12, which together form a diasporameter, are mounted in front of catadioptric objective 1 in suitable bearings so as to rotate about the axis X–A of the apparatus. Each of the prisms 11, 12, have a plane surface arranged at right angles to the axis X–A. As mentioned above, prisms 11 and 12 are individually rotatable under control of the servomechanism devices 9 and 10, respectively. Servomechanism devices 9 and 10 position the prisms 11 and 12 so that a radiation-emitting object is automatically tracked by the apparatus. Movement of the radiation-emitting object is accompanied by a corresponding movement of the prisms 11 and 12 so that the direction of detection remains coincident with the direction of the radiation-emitting object. At each instant the computer 8 calculates the co-ordinate errors to produce error voltages of a sense which controls the servomechanism devices 9 and 10 to position prisms 11 and 12 so as to return the focal point A to its predetermined position. When the direction to the target source coincides with the axis of the apparatus, the error voltages produced by the computer are reduced to zero, or at least a null.

The entire assembly described above is fastened to the frame of the apparatus with the exception of the modulator 2 and the prisms 11 and 12, which are free to rotate.

It is known that the direction of the rays through the set of prisms may deviate voluntarily subject to remaining within a certain cone. Therefore, the assembly forms an automatic tracking system which is capable of causing the direction of radiation to coincide with the direction of a given fixed or moving object.

The advantage of this system consists in that not only are a large number of parts fixedly provided in the device, but that also the movable prisms are only required to have a rotating movement which means that the movable parts will have relatively little inertia. Because the servomechanisms need only produce a rotating motion, they can react very rapidly.

The invention is not restricted to the above example, but also comprises all the variations thereof.

What is claimed is:

1. Apparatus for scanning and tracking a source of radiant energy comprising optical scanning means including a first rotatable prism positioned to receive radiant energy and to direct said energy therethrough, a second rotatable prism positioned to receive the radiant energy and pass said energy to said first rotatable prism, optical focusing means disposed in the vicinity of said scanning means for receiving and focusing the radiant energy passed by said scanning means, means for modulating the output energy of said focusing means, radiation sensitive detector means disposed to receive the radiant energy output of said modulating means and produce an electric signal, means responsive to the output signal produced by said detector means for deriving a control signal, and means responsive to said control signal for selectively rotating said first and second prisms so as to direct said optical scanning means towards said source of radiant energy.

2. Radiant energy scanning and tracking apparatus comprising a frame member, optical scanning means having an axis and including a pair of rotatable prisms for receiving and directing the energy received from a remote energy source, optical focusing means disposed in the vicinity of said scanning means for receiving and focusing the radiant energy passed by said scanning means, means for modulating the output energy of said focusing means, radiation sensitive detector means disposed to receive the radiant energy output of said modulating means and produce an electric signal, said optical focusing means and said detector means being rigidly fastened to said frame member, means responsive to the output signal produced by said detector means for deriving a control signal proportional to the deviation in the direction of said remote energy source from said axis, and means responsive to said control signal for selectively rotating said pair of prisms in a manner which tends to align said scanning means axis with the direction to the remote energy source.

3. Apparatus as defined in claim 2 wherein said modulating means comprises a rotating plate having a plurality of saw-tooth apertures through which said radiant energy passes.

4. Radiant energy scanning and tracking apparatus comprising diasporometer means having first and second rotatable prisms for receiving and redirecting the energy received from a remote energy source, said first and second prisms being successively positioned in the path of said radiant energy so that the radiation passed by said first prism is received by said second prism, focusing means having an optical axis and disposed in a predetermined position near said diasporometer means for receiving the radiant energy passed by said diasporometer means and focusing said energy at a focal point, means disposed near said focal point for modulating the output energy of said focusing means, a radiation sensitive detector element arranged in the vicinity of said modulating means to receive the modulated energy and produce an electric signal, computing means responsive to the output signal produced by said detector element for deriving a control signal, and servomechanism means responsive to said control signal for selectively rotating said first and second prisms so as to direct said disporameter means into alignment with the direction of said energy source from said apparatus.

5. Apparatus as defined in claim 4 wherein each of said first and second prisms is wedge-shaped and has a plane surface arranged substantially at right angles to said optical axis and further comprising means for supporting said prisms for rotation about said optical axis.

6. Radiant energy scanning apparatus comprising optical scanning means having an axis and including first and second prisms rotatable in spaced planes perpendicular to said axis for receiving and directing the energy received from a remote source of radiant energy, said first and second prisms being positioned successively in the path of said radiant energy so that the radiation passed by said first prism is received by said second prism, optical focusing means disposed to receive and focus the radiant energy from said first and second prisms, means responsive to the output radiant energy of said focusing means for modulating said energy, radiation detector means disposed to receive the radiant energy output of said modulating means and produce an electric signal, computing means responsive to the signal produced by said detector means for deriving first and second error control signals, first and second servomechanism drive means responsive to said first and second error signals, respectively, for individually rotating said first and second prisms, respectively, thereby to direct said optical scanning means towards said source of radiant energy.

7. Apparatus as described in claim 6 wherein said modulating means comprises an opaque rotating plate having a plurality of sawtooth apertures therein through which said focused radiant energy is arranged to pass, all of said apertures having identical dimensions.

8. Apparatus as described in claim 7 wherein each of said first and second prisms is wedge-shaped and has a plane surface arranged substantially perpendicular to said axis and further comprising means for supporting each of said prisms for rotation about said axis so that said plane surfaces remain perpendicular to said axis throughout said rotation.

References Cited by the Examiner

UNITED STATES PATENTS

| | | | |
|---|---|---|---|
| 1,682,572 | 8/1928 | Keuffel | 88—14 |
| 2,393,631 | 1/1946 | Harrison et al. | 250—83.3 |
| 2,763,177 | 9/1956 | Taylor | 250—203 X |
| 2,877,354 | 3/1959 | Fairbanks et al. | 88—1 |
| 2,930,545 | 3/1960 | Houle et al. | 250—203 X |
| 2,942,118 | 6/1960 | Gedance | 88—1 |
| 2,958,783 | 11/1960 | Taylor | 250—233 X |
| 2,996,945 | 8/1961 | Davis | 250—233 X |
| 3,002,097 | 9/1961 | Nuut | 250—203 |
| 3,014,133 | 12/1961 | Speller et al. | 250—203 |
| 3,054,898 | 9/1962 | Westover et al. | 250—83.3 |
| 3,093,736 | 6/1963 | McLaughlin et al. | 250—83.3 |
| 3,099,748 | 7/1963 | Weiss | 250—203 |

RALPH G. NILSON, *Primary Examiner.*

ARTHUR GAUSS, ARCHIE R. BORCHELT,
*Examiners.*